United States Patent
Tak et al.

(10) Patent No.: US 8,164,427 B2
(45) Date of Patent: Apr. 24, 2012

(54) METHOD FOR OPTIMIZATION IN RFID LOCATION RECOGNITION SYSTEM USING BLUEPRINT

(75) Inventors: Sung Woo Tak, Busan (KR); Tae Hoon Kim, Busan (KR); Byung Hoon Kim, Busan (KR); Ki Joune Li, Busan (KR); Chi Won Son, Busan (KR); Dong Geon Lee, Busan (KR); Young Mann Kim, Busan (KR)

(73) Assignee: Pusan National University Industry-University Cooperation Foundation, Busan (KR)

( * ) Notice: Subject to any disclaimer, the term of this patent is extended or adjusted under 35 U.S.C. 154(b) by 730 days.

(21) Appl. No.: 12/318,327

(22) Filed: Dec. 24, 2008

(65) Prior Publication Data

US 2010/0045439 A1    Feb. 25, 2010

(30) Foreign Application Priority Data

Aug. 22, 2008    (KR) .................. 10-2008-0082387

(51) Int. Cl.
    *G08B 13/14* (2006.01)
(52) U.S. Cl. .................................... 340/10.5; 340/572.1
(58) Field of Classification Search ............... 340/572.1; 455/446–449, 67.11, 67.16, 115.1, 226.1; 325/492
    See application file for complete search history.

(56) References Cited

U.S. PATENT DOCUMENTS

| 5,391,990 | A | * | 2/1995 | Schmitt et al. | 324/320 |
| 5,450,615 | A | * | 9/1995 | Fortune et al. | 455/67.16 |
| 6,119,009 | A | * | 9/2000 | Baranger et al. | 455/446 |
| 6,341,223 | B1 | * | 1/2002 | Park | 455/446 |
| 7,697,602 | B2 | * | 4/2010 | Frey et al. | 375/231 |
| 2006/0287762 | A1 | * | 12/2006 | Takada et al. | 700/227 |
| 2007/0124126 | A1 | * | 5/2007 | Lee et al. | 703/6 |
| 2009/0001984 | A1 | * | 1/2009 | Hwang | 324/307 |

* cited by examiner

*Primary Examiner* — Daniel Wu
*Assistant Examiner* — Mohamed Barakat
(74) *Attorney, Agent, or Firm* — Sherr & Vaughn, PLLC

(57) ABSTRACT

A method for optimization in an RFID location recognition system is developed to use in a blueprint in which an optimum location for installing an RFID reader is determined for using a blueprint so as to improve location recognition. The method includes the steps of inputting a blueprint and dividing a location recognition unit space from the blueprint; establishing a building interior space analysis model and an interior radio propagation space analysis model and deriving a building spatial significance and a radio propagation spatial significance; analyzing correlation between a building space and a radio propagation space and deriving a correlation coefficient; and defining an objective function for determining a location of a RFID reader based on the building spatial significance, the radio propagation spatial significance, and the correlation coefficient between the building space and the radio propagation space and performing optimization.

18 Claims, 8 Drawing Sheets

Fig. 5a

| NID OF 4 BITS | TYPE OF 1 BITS | UTIL OF 4 BITS | VARIABLE SPIDs |
|---|---|---|---|
| 501 | 502 | 503 | 504 |

Fig. 5b

| EID OF 4 BITS | NID1 OF 4 BITS | NID2 OF 4 BITS | UTIL OF 4 BITS |
|---|---|---|---|
| 511 | 512 | 513 | 514 |

METHOD FOR OPTIMIZATION IN RFID LOCATION RECOGNITION SYSTEM USING BLUEPRINT

BACKGROUND OF THE INVENTION

1. Field of the invention

The present invention relates to an RFID-based building interior location recognition system, and more particularly to a method for optimization in an RFID location recognition system using a blueprint in which an optimum location for installing an RFID reader is determined using a blueprint so as to improve location recognition.

2. Description of the Prior Art

An RFID is a technology capable of recognizing a product using Radio Frequency (RF), and an RFID system includes an RF tag including an antenna and a chip, an RFID reader for recognizing the RF tag, and a server for processing tag information collected by the RFID reader.

Especially, the RF tag can store information suitable for a use purpose of the RFID system, and is classified into an active tag having a built-in battery and a passive tag without a built-in battery.

The RFID reader controls the transmission of the RF signal, retrieves and modifies information stored in the RF tag, and is classified into a fixed-type, a mobile-type, and a portable-type.

In the RFID system using the passive RF tag, a recognition range of the RF tag is limited to several meters on the RFID reader. Therefore, it can be seen that the RF tag recognized by the RFID reader, i.e. a product attached with the corresponding RF tag, is located closely to the RFID reader recognizing the RF tag.

The RFID technology is to identify the product attached with the tag using the RF, which stores information of the product on the tag and retrieves the tag information using the RFID reader. The RFID-based location recognition system applied with the RFID technology analyzes the recognition area of the RFID reader so as to identify the location of the recognized tag.

The RFID reader is much more expensive than the RF tag, so that a method for optimization of the area for installing the RFID reader has been required.

The conventional art related to the RFID-based location recognition system employs a method, such as an RF signal analyzing technique for improving the recognition of the location of the RFID reader system in a state of the arrangement of the RFID reader being completed, and a filtering technique for minimizing an influence of errors.

However, such a conventional art has a disadvantage in that it does not regard the space for installing the RFID reader, the location of the RFID reader, and dependence on the improvement of the location recognition, so that efficiency is deteriorated and the improvement of recognition is limited.

SUMMARY OF THE INVENTION

Accordingly, the present invention has been made to solve the difficulty of optimizing the area for installing the RFID reader in the RFID-based building interior location recognition system occurring in the prior art, and an object of the present invention is to provide a method for optimization in an RFID location recognition system using a blueprint in which an optimum location for installing an RFID reader is determined using a blueprint so as to improve location recognition.

Another object of the present invention is to provide a method for installing a location recognition system which identifies a location of the RF tag so that the location recognition is improved in a building interior location recognition system using a fixed-type RFID reader and a mobile and passive RF tag.

Another object of the present invention is to provide a method for optimization in an RFID location recognition system which analyzes the dependence between the space for installing the RFID reader and the arrangement of the RFID reader using the blueprint and automatically determines an optimum location for installing the RFID reader based on the analyzed dependence result for improving the location recognition.

In accordance with an aspect of the present invention, there is provided a method for optimization in an RFID location recognition system using a blueprint which determines a location for arranging an RFID reader, the method including the steps of: inputting a blueprint and dividing a location recognition unit space from the blueprint; establishing a building interior space analysis model and an interior radio propagation space analysis model and deriving a building spatial significance and a radio propagation spatial significance; analyzing correlation between a building space and a radio propagation space and deriving a correlation coefficient; and defining an objective function for determining a location of a RFID reader based on the building spatial significance, the radio propagation spatial significance, and the correlation coefficient between the building space and the radio propagation space and performing optimization.

The step of dividing the location recognition unit space includes the steps of: arranging a consecutive interior space on a particle arranged in a lattice unit and converting the arranged space into a discrete space; initializing a particle information table and determining whether a location of the particle is an inside of a wall or not, in which if the location of the particle is the inside of the wall, a Wall field value is renewed as 1, and if the location of the particle is not the inside of the wall, a Wall field value is renewed as 0; constructing a visibility graph from the particle arranged in the lattice unit; dividing the visibility graph into complete sub-graphs; and deriving the location recognition unit space from the complete sub-graphs and setting a CID field of the particle information table as a PID field having the smallest value in the particles included in the location recognition unit space.

The particle information table includes the PID field representing a unique value of an ID of each particle, a CoordX field representing an abscissa of a particle, a CoordY field representing an ordinate of a particle, a CoordH field representing a height coordinate of a particle, the Wall field representing whether the location of the particle is the inside of the wall or not, an SIGST field representing the building spatial significance of the location of the arranged particle, and the CID field having the smallest PID value among every particle included in the same location recognition unit space of the corresponding particle.

The step of establishing the interior radio propagation space analysis model includes the steps of: analyzing a relation between a building interior space and a building exterior space for deriving an interior space graph model in which the building space is divided into a building interior and a building exterior; analyzing a relation between the stories of the building space for deriving the interior space graph model in which the building interior space is departmentalized into a space for each story; specifying the building space for each story for deriving the interior space graph model in which the building interior space for each story is specified as the location recognition unit space; and analyzing a movement route for revaluating worth of a node in which every available movement route of a tag is considered.

The step of analyzing the relation between the building interior space and the building exterior space includes the steps of: constructing a space node representing the building interior and a space node representing the building exterior; constructing a gate of the building as an interface node; setting the worth of the space node representing the building interior as 1, the worth of the space node representing the building exterior as 0, and the worth of every interface node as 1/the number of interface nodes; constructing an edge between the space node and the interface node according to a definition that, if there is a movement route without passing one node between two arbitrary nodes, the movement route is connected by the edge; and initializing a node information table and an edge information table.

The node information table includes an NID field representing an ID of each node, a TYPE field discriminating if a corresponding node is the space node or the interface node, a UTIL field representing a worth value of the node; and an SPIDs field representing a set of ID of every particle included in the space represented by the node.

The edge information table includes an EID field representing an ID of the edge, an NID 1 field representing an ID value of the node connected to both ends of the edge, an NID 2 field, and a UTIL field representing the worth value of the edge.

The step of analyzing relation between the stories of the building space includes the steps of: departmentalizing the building interior space into a space node representing each story; representing the worth of the departmentalized space node as a ratio of the number of particles included in the corresponding story to the number of total particles; constructing stairs, automatic stairs, and an elevator as an interface node; calculating the worth of the interface node; and constructing an edge between the nodes according to a definition of the edge.

In step of calculating the worth of the interface node, the worth is calculated by $$U_k^{IN} = \frac{U_k^{SN}}{|IN_k|},$$

in which $U_k^{IN}$ refers to the UTIL field value of the interface node of the $K^{th}$ story, and $U_k^{SN}$ refers to the UTIL field value of the space node representing the $K^{th}$ story. Further, $IN_k$ is a set of interface nodes of the $K^{th}$ story.

The step of specifying the building space for each story includes the steps of: departmentalizing the building space for each story into a space node representing the location recognition unit space; representing the worth of the departmentalized space node as a ratio of the number of particles included in the corresponding location recognition unit space to the number of total particles; constructing a gate as an interface node; calculating the worth of the interface node; and constructing an edge between the nodes according to a definition of the edge.

In the step of calculating the worth of the interface node, the worth is calculated by $$U_k = \frac{1}{|Ne(N_k)|} \sum_{j \in Ne(N_k)} U_j,$$

in which $N_k$ refers to the node k, $U_j$ refers to the UTIL field value of the node I, and $Ne(N_k)$ refers to a set of adjoining space nodes of the node K.

The step of analyzing the movement route includes the steps of: constructing the shortest route with respect to every pair of nodes available in the interior space graph model established through the step of specifying the building space for each story; giving the worth of the edge based on constructed shortest route information; normalizing the worth of the edge; and renewing the worth of the node.

In the step of normalizing the worth of the edge, the worth is normalized by $$\text{normalized } EU_j = \frac{EU_j}{\sum_{i \in E} EU_i},$$

in which $EU_j$ refers to the UTIL field value of the edge j.

Further, in the step of renewing the worth of the node, the worth is renewed by $$newU_j = U_j \times \left(1 + \sum_{j \in Edge(N_i)} EU_j\right),$$

in which $Edge(N_i)$ refers to a set of edges connected to the node i.

The step of normalizing the worth of the edge includes the steps of: repeatedly retrieving each edge e included in SPath (i,j) in the edge information table with respect to every pair (i, j) of nodes if the nodes i and j are included in a node set V of the interior space graph G and increasing the UTIL field value of an entry representing the edge e by 1; and normalizing the UTIL field of each edge with reference of a summed value of the UTIL field value of every edge.

The step of deriving the building spatial significance includes the steps of: normalizing a worth of each node based on a result of establishing the building interior space analysis model; deriving a building spatial significance of each particle based on an SPIDs field of a space node stored in a node information table; and storing the derived building spatial significance in an SIGST field of a particle information table.

The step of establishing the interior radio propagation space analysis model includes the steps of: analyzing an RFID signal loss model considering attenuation of an RFID signal; and defining a radio propagation space significance function determining if an RFID reader is installed in an appropriate location when the RFID readers are arranged.

The step of analyzing the RFID signal loss model includes the steps of: analyzing a path loss according to a distance between the RFID reader and an RF tag; analyzing a path loss by a wall and a floor existing between the RFID reader and the RF tag; determining a received signal strength based on the result of analyzing the path loss according to the distance between the RFID reader and the RF tag, the result of analyzing the path loss by the wall and the floor, a signal transmission strength of the RFID reader, an antenna power gain of the RFID reader, and a power gain of the RF tag; and normalizing the received signal strength.

In the step of analyzing the path loss according to the distance between the RFID reader and the RF tag, the path loss is calculated by $$PL(d) = 40\log_{10}\left(\frac{4}{\lambda}\right) + 40\log_{10}(d),$$

in which d refers to a distance m between the RFID reader and the RF tag, PL(d) refers to the path loss (dB) depending on the distance d, and λ refers to a ratio of "speed of light/frequency of the radio wave", serving as a value representing a wavelength of the RF radio wave, and a first term of the right side represents the natural attenuation according to the wavelength of the radio wave and a second term represents the attenuation according to the transmission distance of the signal.

In the step of analyzing the path loss by the wall and the floor existing between the RFID reader and the RF tag, the path loss is calculated by $PL(i,j)=2*WAF*W_{i,j}+2*FAF*F_{i,j}$, in which $PL(i,j)$ refers to a function representing the path loss generated by an obstacle located between the location i of the RFID reader and the location j of the RF tag, the locations i and j are one of the discrete spaces, i.e. the locations of the particles arranged in the lattice unit, a Wall Attenuation Factor (WAF) refers to the path loss factor by the wall, a Floor Attenuation Factor (FAF) refers to the path loss factor by the floor, $W_{i,j}$ refers to the number of walls located between the location i and the location j, and $F_{i,j}$ refers to the number of stories located between the location i and the location j.

In the step of determining the received signal strength, the strength is calculated by $P_r^{(i,j)}=P_t+G_{rr}+G_{rt}+2G_{tag}-PL(d_{i,j})=PL(i,j)$, in which $P_t$ refers to the strength (dB) of the signal transmitted by the RFID reader, $G_{rr}$ refers to the power gain (dB) of a receipt antenna of the RFID reader, $G_{rt}$ refers to the power gain (dB) of a transmission antenna of the RFID reader, $G_t$ refers to the power gain (dB) of a tag antenna, and $d_{i,j}$ refers to a distance between the $i^{th}$ RFID reader and the $j^{th}$ RF tag.

In the step of normalizing the received signal strength, the received signal strength is normalized by $$\text{normalized } P_r^{(i,j)} = \begin{cases} \text{if } P_r^{(i,j)} \langle RX_{Thresh}, 0 \\ \text{if } P_r^{(i,j)} \rangle TX_{power}, 1 \\ \text{if } RX_{Thresh} \langle P_r^{(i,j)} \langle TX_{Power}, \\ \left\{ \dfrac{\ln(k(P_r^{(i,j)}-RX_{Thresh})+\sqrt{k(P_r^{(i,j)}-RX_{Thresh}))^2+1}}{\ln(k(TX_{power}-RX_{Thresh})+\sqrt{(k(TX_{power}-RX_{Thresh}))^2+1}} \right\} \end{cases}$$

in which $RX_{Thresh}$ refers to a threshold of the strength of the received signal requiring for recognizing the received signal.

The step of defining the radio propagation space significance function includes the steps of: determining a received signal strength of an arbitrary location when an RF tag in the arbitrary location can be recognized by a plurality of RFID readers; and determining the received signal strength in every discrete location of the building interior space.

Further, in the step of determining the received signal strength of the corresponding arbitrary location, the received signal strength is determined by $P_r^j=\text{Max}_{r\in RR}\{\text{normalized } P_r^{(i,j)}\}$, in which $R_r$ refers to a set of every RFID reader and $P_r^j$ refers to the strength of the received signal in the location j. Further, the strength of the received signal in each location is determined as the greatest value among the normalized $P_r^{(i,j)}$ value received from all RFID readers.

Further, in the step of determining the received signal strength in every discrete location of the building interior space, the received signal strength is determined by $$\frac{1}{|PA|}\sum_{i\in PA} P_r^j x_i,$$

in which PA refers to a set of all particles, as defined previously, and the determined value is an average value of the strength of the received signal of every discrete location in the building interior space according to the arrangement of the RFID reader.

In the step of defining the objective function for determining the location of the RFID reader, the function is expressed by $$F = \frac{1}{\sum x_i} \sum_{i\in PA} SIG_{ST}(i)x_i \times \frac{1}{|PA|}$$

$$\sum_{i\in PA} P_r^i x_i \times \frac{1}{\sum x_i} \sum_{i\in PA} x_i \left( \sum_{j\in LU-Cell} \left[\frac{RF-\text{Cell}(i) \cap j}{RF-\text{Cell}(i)}\right]^2 \right),$$

in which $SIGST(i)$ refers to an SIGST field value of a particle in a location I, a first term refers to an average value of the building spatial significance of the location of the RFID reader, a second term is a value of the radio propagation spatial significance when the RFID reader is arranged, and a third term is a value of the correlation coefficient between the building space and the radio propagation space when the RFID reader is arranged, and a limitation condition according to the objective function is expressed by $$\sum_{i\in PA} x_i \leq IN.$$

BRIEF DESCRIPTION OF THE DRAWINGS

FIG. 5A is a diagram illustrating a node information table storing information of each node in the step of establishing a building interior space analysis model according to the present invention.

FIG. 5B is a diagram illustrating an edge information table storing information of each edge in the step of establishing a building interior space analysis model according to the present invention.

DETAILED DESCRIPTION OF THE EXEMPLARY EMBODIMENTS

Hereinafter, a method for optimization in an RFID location recognition system using a blueprint according to an exemplary embodiment of the present invention will be described in detail.

The characteristic and advantages of the method for optimization in the RFID location recognition system using the blueprint according to the present invention will be clearly understood with the detailed description of the exemplary embodiments.

Figure 1:
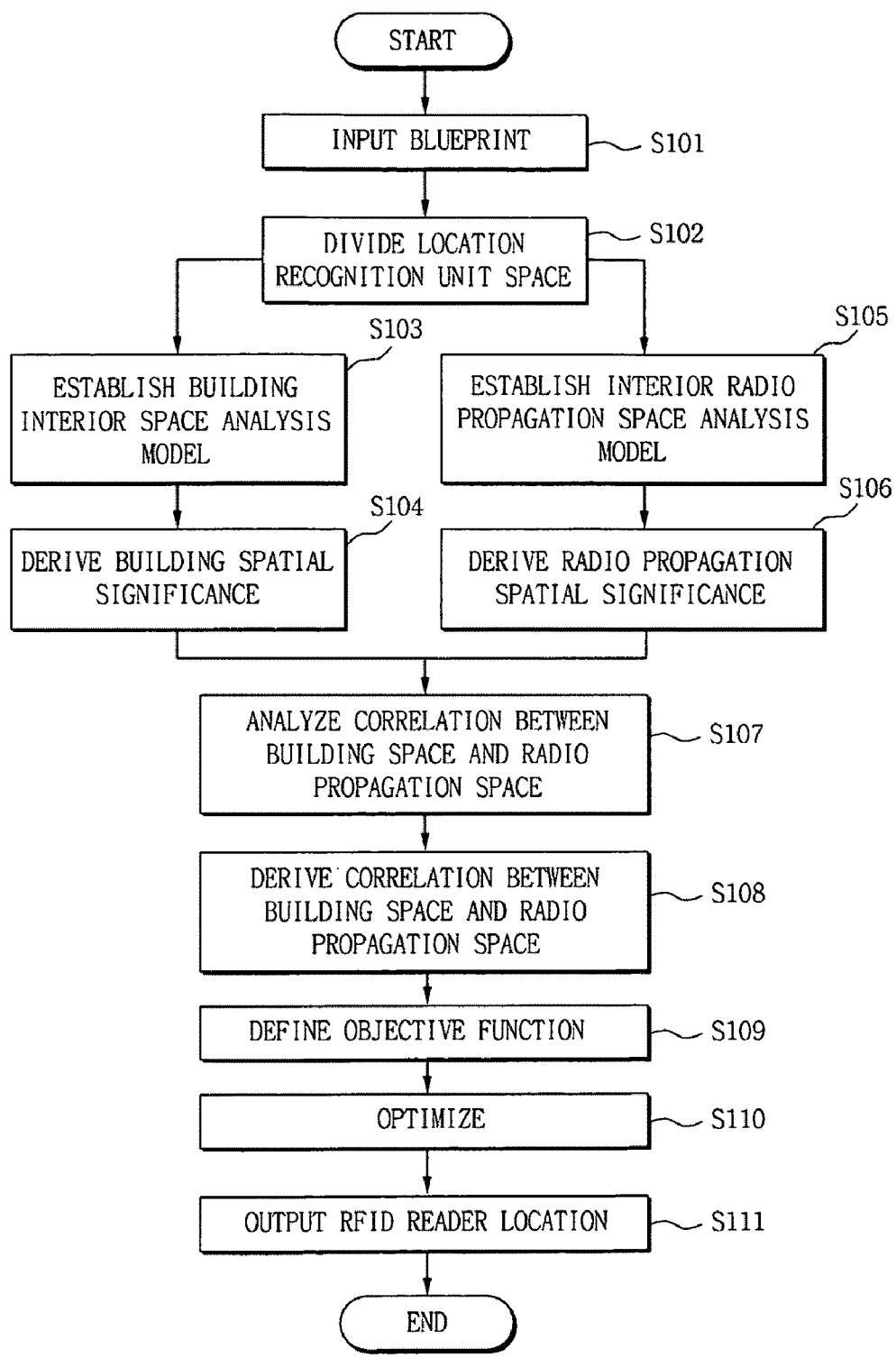
FIG. 1 is a flowchart illustrating a step of optimizing an RFID location recognition system using a blueprint according to the present invention.

FIG. 1 is a flowchart illustrating a step of optimizing a RFID location recognition system using a blueprint according to the present invention.

The present invention extracts information from the blueprint and determines a location for installing an RFID reader in order to improve the RFID-based building interior location recognition system.

To this end, first, in the present invention, a location recognition unit space is divided from the blueprint.

The RFID-based location recognition system employs a scheme of recognizing a location based on a cell so that a step of dividing an interior space into the location recognition unit space is necessary. Therefore, in the present invention, a scheme is used in which the interior space of the blueprint is divided into a plurality of location recognition unit spaces.

Second, the RFID reader extracts building spatial significance of all regions in which the RFID reader can be installed. The RFID reader is expensive, so that the RFID reader cannot be arranged in every location recognition unit space.

Therefore, the present invention analyzes the blueprint, establishes a building interior space analysis model, and extracts the significance of each location in which the RFID reader can be installed based on the established building interior space analysis model.

A value of the extracted significance is calculated based on the blueprint so that the value is defined as the "building spatial significance."

Third, the radio propagation spatial significance of every region in which the RF tag is movable is extracted.

If the RFID reader is arranged within the building interior, the reachable strength of the RF signal is determined according to the location of the RFID reader. If the strength of the RF signal reachable to an arbitrary region is very weak, the recognition of the RF signal can be deteriorated.

Therefore, in the present invention, the strength of the received signal of the RF tag according to the arrangement of the RFID reader is calculated. Then, based on the calculated strength of the received signal, a significance function for determining whether the RFID reader can recognize all RF tags existing in a building interior space is defined.

The significance value defined as above is calculated based on a characteristic of the RF signal, so that it is hereinafter referred as "radio propagation spatial significance."

Fourth, the correlation between the building space and the radio propagation space is analyzed.

The RF signal can penetrate a wall so that two RF tags existing in the different location recognition unit spaces can be recognized by the same RFID reader. Contrary to this, two RF tags existing in the same location recognition unit space can be recognized by different RFID readers.

Therefore, it is important to select the location of the RFID reader capable of minimizing the difference between the building space and the radio propagation space.

In the present invention, this is defined as the 'correlation coefficient between the building space and the radio propagation space.'

Fifth, the present invention includes a step of defining an 'objective function' for determining the optimum location of the RFID reader using the building spatial significance, the radio propagation spatial significance, and the correlation coefficient between the building space and the radio propagation space which are resulted from the steps of establishing the building interior space analysis model, establishing the interior radio propagation space analysis model, and analyzing the correlation coefficient between the building space and the radio propagation space.

Hereinafter, the method for optimization in the RFID location recognition system using the blueprint according to the present invention will be described in detail.

FIG. 1 illustrates the step of optimizing of the RFID location recognition system using the blueprint.

First, the blueprint is inputted S101 and the building interior space is divided into a plurality of location recognition unit space S102.

Then, the building interior space analysis model and the interior radio propagation space analysis model are established S103 and S105, and the building spatial significance and the radio propagation spatial significance of each area within the building space are derived S104 and S106.

At this time, the steps of establishing the building interior space analysis model and the interior radio propagation space analysis model are performed in parallel, the correlation between the building space and the radio propagation space is analyzed if two steps are all completed S107, and the correlation coefficient between the building space and the radio propagation space is derived S108.

Then, the objective function is defined based on the building spatial significance, the radio propagation spatial significance, and the correlation coefficient between the building space and the radio propagation space S109, and the optimum location of the RFID reader is determined through the optimizing scheme S110.

Here, the step of optimizing employs a well-known genetic algorithm scheme so as to output the optimum location of the RFID reader S111.

The step of dividing the location recognition unit space in the step of optimizing of the RFID location recognition system using the blueprint according to the present invention will be described in detail.

Figure 2:
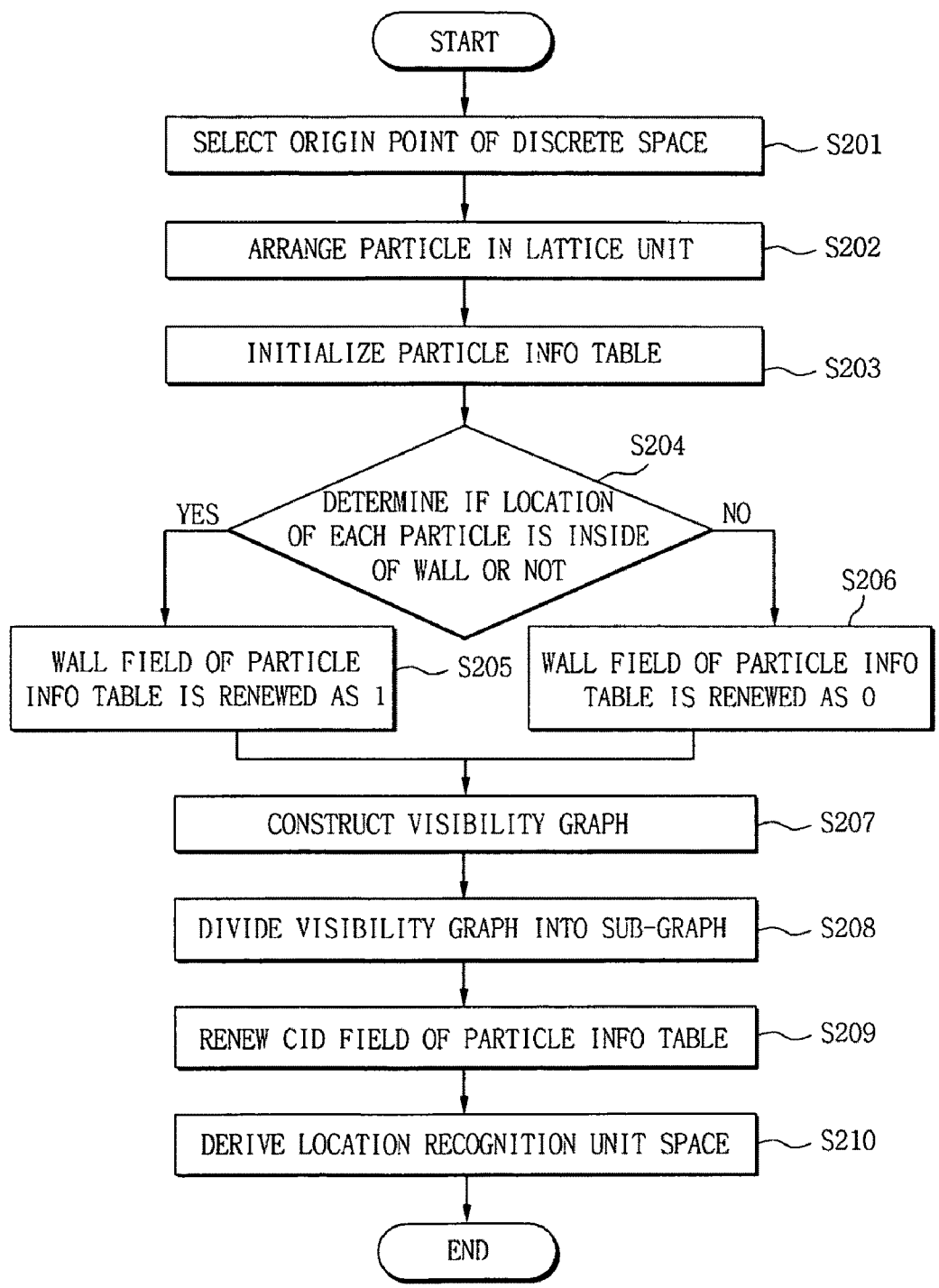
FIG. 2 is a flowchart specifically illustrating a step of dividing a location recognition unit space according to the present invention.

FIG. 2 is a flowchart specifically illustrating a step of dividing the location recognition unit space according to an exemplary embodiment of the present invention.

The RFID location recognition system employs a cell-based location recognition scheme so that the interior space of the building should be divided into a plurality of cells, i.e. a plurality of location recognition unit spaces.

In the present invention, the interior space of the building is divided into a plurality of location recognition unit spaces using the blueprint.

The interior space of the building is a consecutive 3-dimensional space, but computer software cannot represent every consecutive value. Therefore, in the step of dividing the location recognition unit space, the interior space of the building is expressed as a discrete space.

To this end, a left-below corner point with the lowest height in the blueprint is selected as the origin point S201 and a particle is arranged by a lattice unit S202.

The distance between the particle and an adjoining particle is $X_{DEF}$ wide, $Y_{DEF}$ long, and $H_{DEF}$ high. According to the exemplary embodiment of the present invention, the values of $X_{DEF}$, $Y_{DEF}$, and $H_{DEF}$ are designated as 30 cm, respectively, but the values can be varied according to the characteristic of the location recognition system.

Then, particle $P_{i,j,k}$ refers to a particle existing at a point of $i \times X_{DEF}$ wide, $j \times Y_{DEF}$ long, and $k \times H_{DEF}$ high with reference to the origin point, and the origin point can be represented as $P_{0,0,0}$ according to the definition. Also, PA refers to a set of all particles.

Next, a particle information table is initialized S203.

Figure 3:
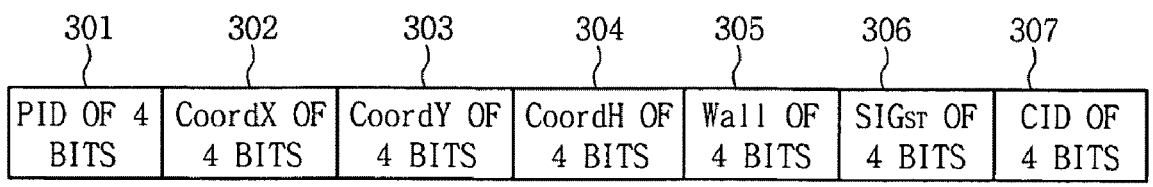
FIG. 3 is a particle information table representing a characteristic of a candidate region for installing the RFID reader according to the present invention.

The particle information table is constructed like FIG. 3 and is used in every step of analyzing the building interior space analysis model, the interior radio propagation space analysis model, and the correlation coefficient between the building space and the radio propagation space.

In the particle information table of FIG. 3, a Particle ID (PID) field 301 of 4 bits is a unique value representing an ID of each particle.

A CoordX field 302 of 4 bits is the abscissa of a corresponding particle.

A CoordY field 303 of 4 bits is the ordinate of a corresponding particle.

A CoordH field 304 of 4 bits is the height coordinate of a corresponding particle.

A unit of the CoordX field, CoordY field, and CoordH field is $X_{DEF}$, $Y_{DEF}$, $H_{DEF}$, respectively. A wall field 305 of 1 bit represents whether a location of the corresponding particle is the inside of the wall or not. If a Wall field value is 1, the location of the particle is the inside of the wall, and if the Wall field value is 0, the location of the particle is not the inside of the wall. Therefore, it is possible to arrange the RFID reader on the particle having a Wall field value of 1.

Further, an $SIG_{ST}$ field 306 of 4 bits refers to a value of the building spatial significance of the location of the corresponding particle. Last, a Cell ID (CID) field 307 of four bits refers to the smallest PID value among every particle included in the same location recognition unit space of the particle. Therefore, every particle having the same SID field is included in the same location recognition unit space.

In the step of initializing the particle information table, the PID field of each particle is sequentially initialized and the CoordX field, CoordY field, and CoordH field are initialized according to the location of the particle. Then, all of the remaining fields are initialized as 0.

Next, the location of each particle is calculated based on the CoordX field, CoordY field, and CoordH field and determines if the corresponding particle exists in an inside of the wall or in an outside of the wall, referring to the blueprint S204.

If the corresponding particle exists in the inside of the wall, the Wall field value of the particle information table is amended to 1 S205, and if the corresponding particle exists in the outside of the wall, the Wall field value of the particle information table is renewed as 0 S206.

Next, a visibility graph having every particle with the Wall field value of 0 serving as a node is constructed S207.

The visibility graph refers to a graph including an edge if a straight line connecting tow arbitrary nodes does not cross the wall. Then, the constructed visibility graph is expressed by VG=(PA,E).

Here, as described above, PA is a set of all particles, and E is a set of edge generated by a characteristic of the visibility graph.

Next, the constructed visibility graph is divided into a plurality of complete sub-graphs S208.

Hereinafter, a method for constructing the complete sub-graphs will be described.

First, the complete graph (CG) is initialized as a null set.

An arbitrary particle i ($\in$PA) is selected and inputted into the CG set, and the particle i is removed from PA.

Then, the particle j connected to all particles included in the CG set is selected, and if there is the particle j satisfying the above condition, the particle j is inputted into the CG set and is removed from the PA, and then the particle j connected to all particles included in the CG set is selected again.

If there is not the particle j satisfying the above condition, the sub-graph of the VG in which all particles included in the CG serves the node is the CG.

At this time, the smallest value among the PID field values of all particles included in the CG is renewed as the CID field value of all particles included in the CG S209.

If the PA is the null set, the construction of the CG is completed, and if the PA is not the null set, the process of initializing the CG as the null set is performed again.

Next, the location recognition unit space is derived S210. If the construction of the complete sub-graph is completed, all particles are included in at least one complete sub-graph, and all particles included in each complete sub-graph come to have the same CID field value.

In the step of dividing the location recognition unit space described with reference to FIG. 2, the set of particles having the same CID field value is defined as the location recognition unit space and the location recognition unit space is geographically a convex polyhedron including the particle having the same CID field value.

Hereinafter, the steps of establishing the building interior space analysis model, establishing the interior radio propagation space analysis model, and analyzing the correlation coefficient between the building space and the radio propagation space in the optimizing of the RFID location recognition system using the blueprint according to the present invention will be described in detail.

Figure 4A:
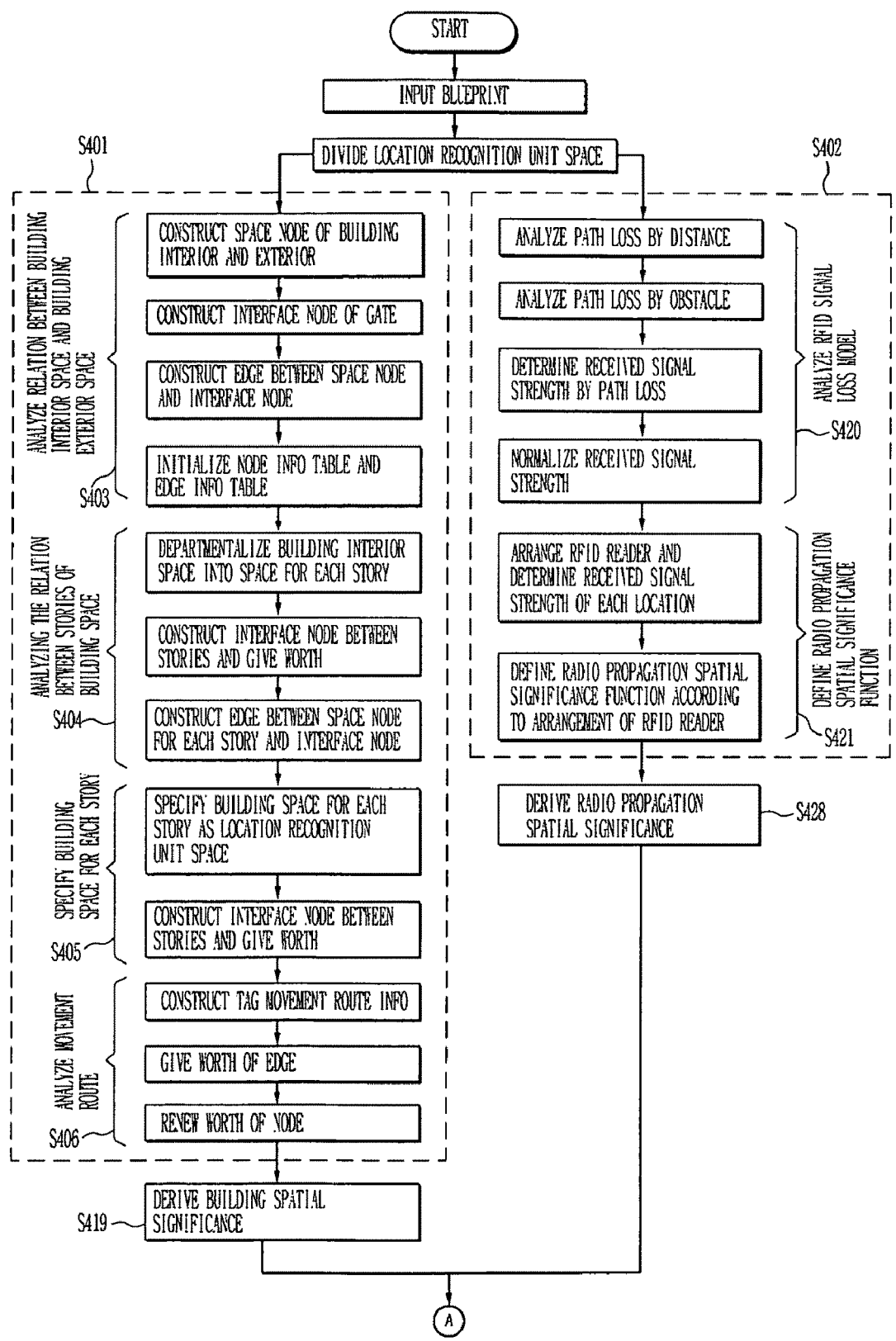
FIGS. 4A and 4B are flowcharts illustrating a step of establishing a building interior space analysis model, a step of establishing an interior radio propagation space analysis model, and a step of analyzing the correlation between a building space and a radio propagation space according to the present invention.
Figure 4B:
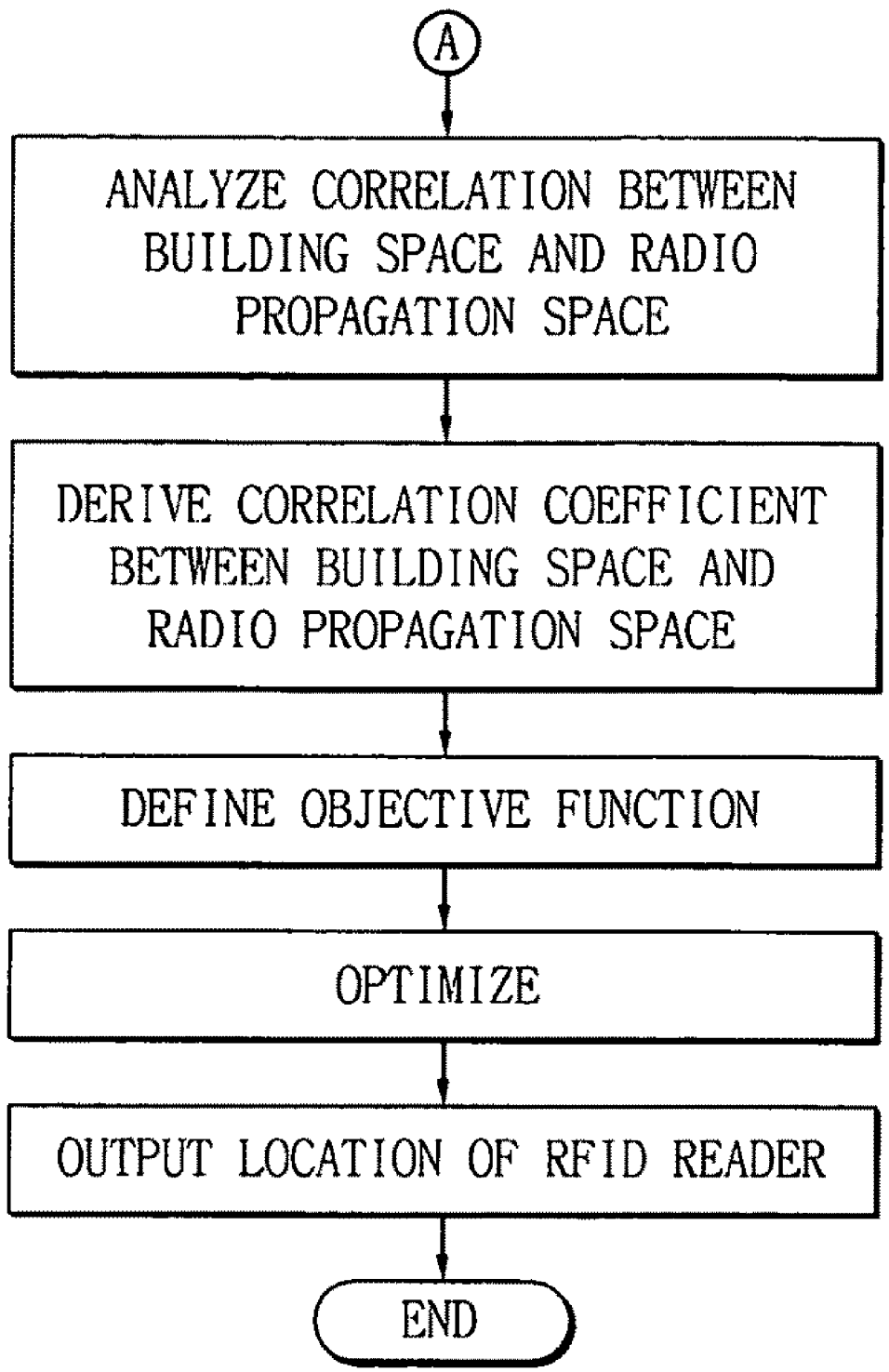

FIGS. 4A and 4B are flowcharts illustrating the step of establishing the building interior space analysis model, establishing the interior radio propagation space analysis model, and analyzing the correlation between the building space and the radio propagation space according to the present invention.

Step S103 of establishing the building interior space analysis model of FIG. 1 is expanded like step S401 of FIG. 4.

The step of establishing the building interior space analysis model is to determine a candidate location of the RFID reader based on the geographical information of the building interior, i.e. the building spatial significance of the location in which each particle is arranged. To this end, in the present invention, an interior space graph model is derived based on the blueprint and the building spatial significance is determined based on the derived interior space graph model.

The interior space graph model is a graph model including the node and the edge.

The node is classified into a space node and an interface node. The space node represents a specific space and the interface node represents an (building interior) object connecting the space node (building interior). The space node and interface node are gradually specified in the step of establishing the building interior space analysis model. If there exists a movement route which does not pass one node between two arbitrary nodes, the movement route is connected by the edge.

The step of analyzing the building interior space in which the building interior space analysis model is derived is hierarchically specified through 4 steps, i.e. the steps of analyzing the relation between a building interior space and a building exterior space S403, analyzing the relation between the stories of the building space S404, specifying the building space for each story S405, and analyzing the movement route S406.

First, in step S403 of analyzing the relation between the building interior space and the building exterior space, the space is classified into the building interior and the building exterior.

Therefore, the space node is divided into the space node representing the building interior and the space node representing the building exterior s407.

The interface node is the building interior object connecting the space node so as to include a plurality of gates connecting the interior and exterior of the building S408.

Next, the connection between the nodes is constructed by the definition of the edge as follows S409.

First, in order to move from the interior space (node) to the exterior space (node) of the building, it is necessary to pass the gate (interface node) so that the space node representing the building interior is not connected with the space node representing the building exterior.

In the meantime, in a case of moving via the gate in the interior space of the building, it is possible to move without passing the building exterior, and also in a case of moving via the gate in the exterior space of the building, it is possible to move without passing the building interior.

Therefore, the space node representing the building interior is connected with all interface nodes, and also the space node representing the building exterior is connected with all interface nodes.

This is symbolized as follows. Graph G of the building interior space analysis model derived in the step of analyzing the relation between the building interior space and the building exterior space is expressed by G=(V,E).

V is a node included in the building interior space analysis model and is a union of a space node set SN and an interface node set IN, and expressed by V=SN ∪ IN. E is the edge included in the building interior space analysis model and is expressed by following Equation 1.

$$E=\{(x,y)|x \in SN, y \in IN\} \quad (1)$$

Such information on the interior space graph is stored in an interior space graph node information table of FIG. 5A and the edge information table of FIG. 5B S410.

An NID field 501 of 4 bits in the node information table of FIG. 5A is a unique value representing an ID of each node.

A TYPE field 502 of 1 bit includes a value which discriminates if the corresponding node is the space node or the interface node, and if the TYPE field value is 0, the corresponding node is the space node, if the value of the TYPE field is 1, the corresponding node is the interface node.

A UTIL field 503 of 4 bits refers to a worth value and a weight value representing whether or not the space indicated by the corresponding node is suitable for the location for installing the RFID reader in the location recognition system. Further, if the step of establishing the building interior space analysis model is completed, the UTIL field 503 comes to be the value of the building spatial significance of all particles included in the corresponding space.

A step of initializing the UTIL field value is performed as follows. The UTIL field default value of the space node representing the building interior is 1.0 and the UTIL field default value of the space node representing the building exterior is 0.0.

Further, the UTIL field value of every interface node is initialized as 1.0/|IN|.

A Set of Particle IDs (SPIDs) field of variable length is a set of IDs of all particles included in the corresponding space, an SPIDs field default value of the space node representing the building interior is PA and an SPIDs field default value of the space node representing the building exterior is the null set according to the definition. Further, the SPIDs field of each interface node is a set of particles closest to the corresponding gate.

An EID field 511 of 4 bits in the edge information table of 5B is a unique value representing an ID of the corresponding edge. An NID1 field 512 of 4 bits and an NID2 field 513 of 4 bits is an ID value of a node connected to both ends of the edge, respectively.

A UTIL field 514 of 4 bits is a worth value of the edge, is a value representing a ratio of a route including the corresponding edge in every movement route in the building interior space, and is used in a step of analyzing the movement route.

Now, step S404 of analyzing the relation between the stories of the building space will be described in detail.

In step S404 of analyzing the relation between the stories of the building space, the interior space of the building is departmentalized into a space for each story again S411.

Therefore, in step S411, the space node representing the building interior is removed from the node information table, and the space node representing each story is added to the node information table.

Each particle included in the SPIDs field of the removed space node representing the building interior is included in the SPIDs field of the space node representing the story including the particle among the newly added space nodes.

Also, the UTIL field of the space node representing each story is initialized as a ratio of the number of particles included in the corresponding story to the number of total particles, i.e. |SPIDs field|/|PA|.

Therefore, if every UTIL field value of every newly added space node is summed up, the summed value comes to be the same as 1.0 of the UTIL field value of the removed space node.

Next, a new interface node connecting the space node representing each story is added to the node information table S412.

The interface node is the building interior object connecting the space node so it includes stairs for moving between the stories, an automatic stairs, and an elevator. The SPIDs field of each interface node is a set of particles closest to the corresponding stairs, the automatic stairs, or the elevator and the UTIL field value is determined by following Equation 2.

$$U_k^{IN} = \frac{U_k^{SN}}{|IN_k|} \quad (2)$$

In equation (2), $U_k^{IN}$ refers to the UTIL field value of the interface node of the $K^{th}$ story, and $U_k^{SN}$ refers to the UTIL field value of the space node representing the $K^{th}$ story. Further, $IN_k$ is a set of interface nodes of the $K^{th}$ story.

Next, the edge between the space node for each story and the interface node is constructed based on the definition of the edge S413.

If it moves from one story to another story, it is necessary to pass the stairs, the automatic stairs, or the elevator, so that two arbitrary space nodes respectively representing two stories are not connected with each other. Further, if it moves from one interface node to another interface node in the same story, it is necessary to pass the corresponding story (space node), so that the space nodes are not connected with each other.

In the meantime, the space node and the interface node in the same story are connected by the definition of the edge. Further, like moving to the lower story using the elevator or moving to the upper story using the stairs, even though the interface nodes are located in the different stories, two interface nodes allowing the direct movement are connected with each other.

The edge E of the graph G of the building interior space analysis model derived by analyzing the relation between the stories of the building space is expressed by following Equation 3.

$$E=\{(x,y)|x \in SN, y \in IN\}_{Spacenode\ x\ and\ interfacenode\ y\ are\ included\ in\ the\ same\ floor}. \cup \{(x,y)|x \in IN, y \in IN\}_{interfacenodes\ x\ and\ y\ are\ included\ in\ the\ different\ floors\ and\ can\ directly\ move.} \quad (3)$$

Then, in step S405 of specifying the building space for each story, the interior space of each story is departmentalized into the location recognition unit space S414.

Accordingly, in step S414, the space node representing each story is removed from the node information table and the space node representing the location recognition unit space included in the corresponding story is added to the node information table.

At this time, each particle included in the SPIDs field of the removed space node is included in the SPIDs field of the space node representing the location recognition unit space including the particle among the newly added space node. Then, the UTIL field of the space node representing each location recognition unit space is initialized as the number of particles included in the corresponding location recognition unit space among the number of total particles.

Next, the new interface node connecting the newly added space node is added to the node information table S415.

The interface node is the building interior object connecting the space node so that it includes a gate allowing the movement between the location recognition unit spaces. The SPIDs field of each interface node is a set of particles closest to the corresponding gate and the UTIL field value is expressed by following Equation 4.

$$U_k = \frac{1}{|Ne(N_k)|} \sum_{j \in Ne(N_k)} U_j \quad (4)$$

In equation (4), $N_k$ refers to the node k and $U_i$ refers to the UTIL field value of the node i.

Further, $Ne(N_k)$ refers to a set of adjoining space nodes of the node K. Therefore, the worth of the interface node is an average worth value given to the adjoining space node by equation (4).

In the steps of analyzing the relation between the building interior space and the building exterior space, analyzing the relation between the stories of the building space, and specifying the building space for each story, the space node is departmentalized as the steps are progressed and the worth of the space node is divided.

Further, the worth of the interface node is determined by the worth of the adjoining space node so that the worth of the interface node generated in a previous step is generally greater than that of the interface node generated in a later step.

This is because, in view of the structural aspect of the building, the gate is an important place capable of determining if a tag is located in the building interior, and the stairs, the elevator, and the automatic stairs are the important place capable of determining if a tag is included on which story of the building.

Then, step S406 of analyzing the movement route is progressed as follows.

Only the geographical information of the building is used in steps S401, S404, and S405, but the movement route of the RF tag moving in the location recognition system should be considered.

Therefore, in the step of analyzing the movement route, which is the final step for establishing the building interior space analysis model, every route in which the RF tag can move is considered and the worth of the space node and the interface node is renewed.

The first step of analyzing the movement rout is to construct information of every route in which the tag can move S416.

In step S416, the shortest route with respect to a pair of every location recognition unit space is constructed. That is, in the interior space graph model constructed through the step of specifying the building space for each story, the shortest route with respect to every pair of nodes is constructed as possible as it can. The shortest route of the pair of nodes (i,j) is represented as SPath(i,j). An algorithm constructing the shortest route employs the Dijkstra algorithm.

Then, the worth of the edge is given S417. The step of giving the worth of the edge is expressed by following Equation 5.

$$\text{normalized } EU_j = \frac{EU_j}{\sum_{i \in E} EU_i} \quad (5)$$

In equation (5), $EU_j$ refers to the UTIL field value of the edge j.

(1) Step (2) below is repeated with respect to every pair of nodes (i, j). (Only, the nodes i and j are included in a node set V of the interior space graph G.)

(2) Each edge e included in SPath (i, j) is retrieved in the edge information table and then the UTIL field value of an entry representing the edge e is increased by 1.

(3) The UTIL field of each edge is normalized with reference to the summed value of the UTIL field values of every edge, like equation (5).

Subsequently, in step S418 of renewing the worth of the node which is the final step for analyzing the movement route, the worth of the node obtained in the step of specifying the building space for each story using the previously calculated worth of the edge, i.e. the UTIL field value of the node information table is renewed as Equation (6).

$$newU_j = U_j \times \left(1 + \sum_{j \in Edge(N_i)} EU_j\right) \quad (6)$$

In equation (6), $Edge(N_i)$ refers to a set of edges connected to the node i.

A step of deriving the building spatial significance is as follows.

In step S419 of deriving the building spatial significance, the building spatial significance of each particle is calculated based on a result of the step of establishing the building interior space analysis model.

First, by step S418 of renewing the worth of the node, the sum of the worth of every node exceeds 1. Therefore, the worth value of each node, i.e. the UTIL field value of the node information table, is normalized with reference to the sum of the worth of every node.

Now, the building spatial significance of each particle arranged by a lattice unit is calculated as follows.

An arbitrary particle is included in the SPIDs field of the space node stored in the node information table at least but maximum one time. Therefore, if there is a space node including the corresponding particle, the UTIL field value of the space node comes to be the value of the building spatial significance of the particle, to be stored in the SIGST field 306 of the particle information table.

In the meantime, the particle concurrently included in the SPIDs field of an arbitrary interface node and the SPIDs field of the space node selects the greater value between the UTIL values of two nodes as the spatial significance value of the particle and the selected value is stored in the SIGST field of the particle information table.

Then, the step of establishing the interior radio propagation space analysis model of FIG. 1 is implemented as step S402 of FIG. 4.

The purpose of establishing the interior radio propagation space analysis model is to arrange the RFID readers allowing the RF signal to reach every space within the building.

If the RFID readers are arranged in the building interior, the strength of the RF signal capable of reaching the location of each particle depending on the location of the arranged RFDI reader is determined. Therefore, in order to optimally arrange the RFID readers, the RF tag should be able to communicate with at least one RFID reader in anywhere in the building's interior.

To this end, when the plurality of RFID readers are installed in a specific location on the building's interior space, it is determined if the RFID reader is installed in an appropriate location on a basis of the signal strength of the RFID reader capable of reaching every other location.

Especially, a function is defined in which the strength of the signal of the RFID reader reaching each location is expressed by one variable, and this function refers to a radio propagation spatial significance function and the result value of the function refers to the radio propagation spatial significance.

In the meantime, because the consecutive building interior space is represented as the discrete space in the present invention, the location for installing the RFID reader and the location for measuring the signal strength are selected from the locations of the particles arranged in a lattice unit.

As shown in FIG. 4, in order to achieve the above purpose, the step of analyzing the radio propagation space includes step S420 of analyzing an RF signal loss model for determining the path loss of the RF signal transmitted in the building interior space and the strength of the received signal and step S421 of defining the radio propagation spatial significance function for determining a radio propagation spatial significance value based on the result of step S420.

Step S420 of analyzing the RFDI signal loss model is as follows.

In the step of analyzing the RF signal loss model, when the transmitted signal is transmitted to another location, the RFID reader estimates the path loss of the RF signal using the blueprint.

The RF signal transmitted by the RFID reader is attenuated due to a natural dispersion until the RF tag receives the RF signal. The volume of the attenuation of the signal is increased as the distance between the RFID reader and the RF tag becomes more distant.

Therefore, first, the path loss of the RF signal by the transmission distance is analyzed S422.

The RF tag in the location recognition system using the fixed-type RFID reader and the passive RF tag receives the RF signal transmitted by the RFID reader and transmits the received RF signal to the RFID reader again using the energy of the received RF signal.

Therefore, the path loss PL(d) of the RF signal depending on the transmission distance d of the RF signal considers the bi-directional communication and is expressed by Is following Equation 7.

$$PL(d) = 40\log_{10}\left(\frac{4}{\lambda}\right) + 40\log_{10}(d) \tag{7}$$

In equation 7, d refers to a distance m between the RFID reader and the RF tag, PL(d) refers to the path loss (dB) depending on the distance d, and λ refers to a ratio of "speed of light/frequency of the radio wave", serving as a value representing a wavelength of the RF radio wave.

In equation 7, the first term of the right side represents the natural attenuation according to the wavelength of the radio wave and the second term represents the attenuation according to the transmission distance of the signal.

Next, when the RF signal transmitted by the RFID reader is transmitted in the building interior space, the path loss is generated due to an obstacle. In particular, as the attenuation of the RF signal is distinctly generated on the wall and floor, the path loss decreased by the wall and floor located between the RFID reader and the RF tag is analyzed S423.

The path loss decreased by the obstacle is determined by the number of obstacles located between the RFID reader and the RF tag and a factor for the path loss according to the characteristic of the obstacle. Further, the path loss is generated in both directions according to the characteristic of the RFID system, it is expressed by following Equation 8.

$$PL(i, j) = 2*WAF*W_{i,j} + 2*FAF*F_{i,j} \tag{8}$$

In equation 8, PL(i, j) is a function representing the path loss generated by the obstacle located between the location i of the RFID reader and the location j of the RF tag.

Here, the location i and j is one of the discrete spaces, i.e. the locations of the particles arranged in the lattice unit. A Wall Attenuation Factor (WAF) refers to a path loss factor by the wall and a Floor Attenuation Factor (FAF) refers to the path loss factor by the floor. Further, $W_{i,j}$ refers to the number of walls located between the location i and the location j and $F_{i,j}$ refers to the number of stories located between the location i and the location j.

In the right side of equation 8, the reason for multiplying each term by constant 2 is to consider every path loss generated in the links of the both directions.

Next, a received signal strength determination function according to the path loss is defined considering the path loss by the distance and the path loss by the obstacle at the same time S424.

To this end, $P_r^{(i,j)}$ representing the strength (dB) of the signal received by the RF tag when the RFID reader located in the location i communicate with the RF tag located in the location j is expressed by following Equation 9.

$$P_r^{(i,j)} = P_t + G_{rr} + G_{rt} + 2G_{tag} - PL(d_{i,j}) - PL(i, j) \tag{9}$$

In equation 9, $P_t$ refers to the strength (dB) of the signal transmitted by the RFID reader, Grr refers to the power gain (dB) of a receipt antenna of the RFID reader, $G_{rt}$ refers to the power gain (dB) of a transmission antenna of the RFID reader, $G_t$ refers to the power gain (dB) of a tag antenna, and $d_{i,j}$ refers to a distance between the i$^{th}$ RFID reader and the j$^{th}$ RF tag.

Figure 6:
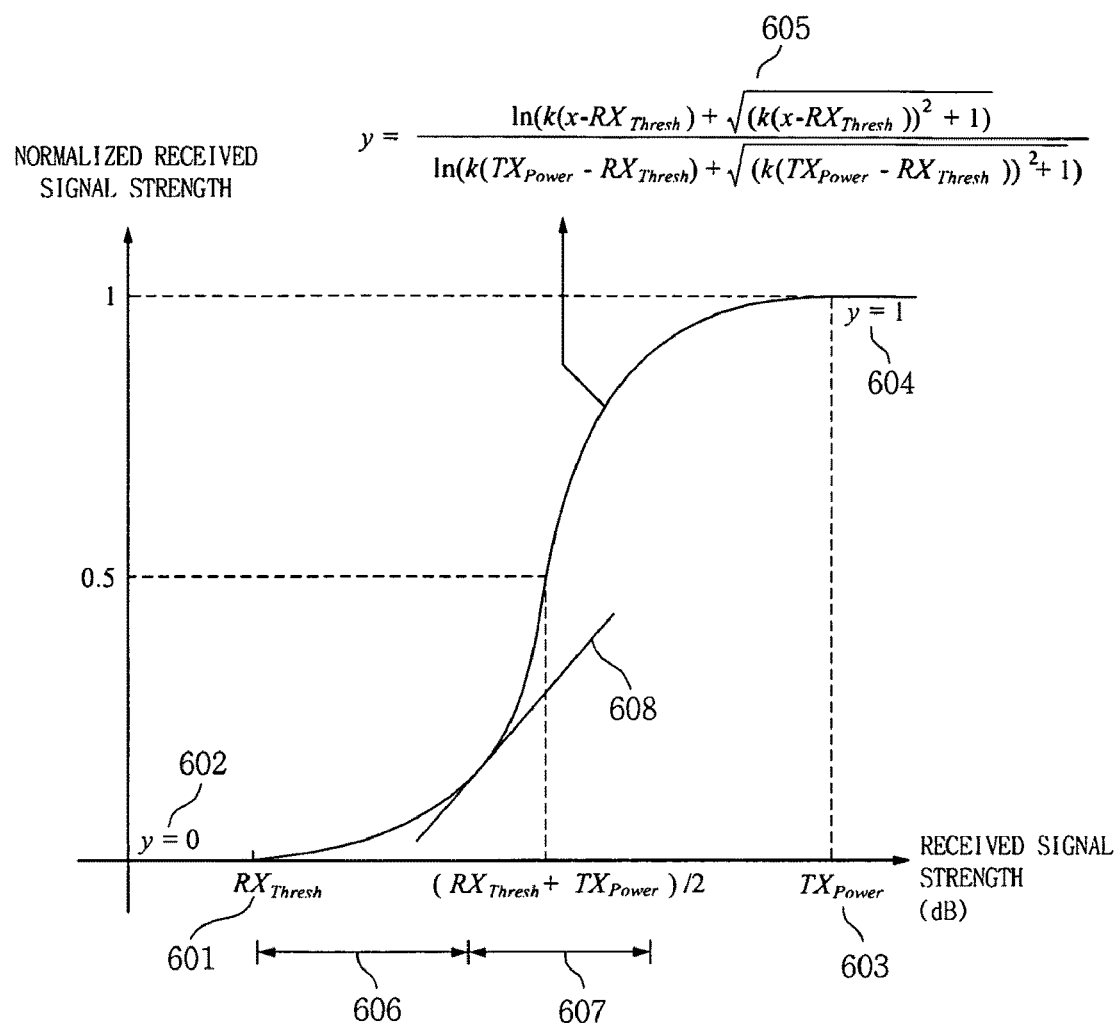
FIG. 6 is a graph illustrating strength of a received signal of a normalized RF tag according to the RFID arrangement in the step of establishing an interior radio propagation space analysis model according to the present invention.

Next, the strength of the received signal obtained by equation 9 is normalized by Equation 10 shown in FIG. 6 S425.

$$\text{normalized } P_r^{(i,j)} = \begin{cases} if P_r^{(i,j)} \langle RX_{Thresh}, 0 \\ if P_r^{(i,j)} \rangle TX_{power}, 1 \\ if RX_{Thresh} \langle P_r^{(i,j)} \langle TX_{Power}, \end{cases} \quad (10)$$

$$\left\{ \frac{\ln(k(P_r^{(i,j)} - Rx_{Thresh}) + \sqrt{k(P_r^{(i,j)} - Rx_{Thresh}))^2 + 1}}{\ln(k(TX_{power} - RX_{Thresh}) + \sqrt{(k(TX_{power} - RX_{Thresh}))^2 + 1}} \right\}$$

In equation 10, $RX_{Thresh}$ refers to a threshold of the strength of the received signal requiring for recognizing the received signal. If the strength of the signal received by the RF tag is less than $RX_{Thresh}$, the signal fails to be recognized and is determined as noise.

Therefore, if the strength of the signal received by the RF tag is less than $RX_{Thresh}$, the strength of the normalized received signal is 0 (602).

In the meantime, the strength of the signal received by the RF tag cannot exceed the $TX_{Power}$ 603 of the strength of the signal transmitted by the RFID reader. Therefore, if the strength of the signal received by the RF tag is greater than $TX_{Power}$, the strength of the normalized received signal is 1 604.

Further, if the strength of the signal received by the RF tag is greater than $RX_{Thresh}$ and less than $TX_{Power}$, the strength of the normalized received signal is determined as the last term of equation 10 605.

Especially, in this function, if the strength of the received signal is $RX_{Thresh}$, the strength of the normalized received signal is 0 and if it is $TX_{Power}$, the strength of the normalized received signal is 1. Further, as the strength of the received signal is close to $RX_{Thresh}$, the inclination is gentle. That reflects the characteristic that as the strength of the received signal is close to $RX_{Thresh}$ 606, the RF tag has a high possibility of leaving the recognition area of the RFID reader due to the movement of the RF tag.

On the other hand, as the strength of the received signal is close a central point of the $RX_{Thresh}$ and the $TX_{Power}$ 607, the inclination is step. That reflects the characteristic that if the strength of the received signal is great, the RF tag is sufficiently close to the RFID reader, so that the RF tag has a very low possibility of leaving the recognition area of the RFID reader, even if the RF tag moves.

In the meantime, k is a radio propagation space constant and determines the inclination 608 of the graph of FIG. 6. Therefore, it is possible to control the influence of the RF tag depending on the value of k.

In the exemplary embodiment of the present invention, the basic value of k is 2,000 and is variable depending on the purpose of the location recognition system.

The step of defining the radio propagation spatial significance function is as follows.

In the step of analyzing the RFID signal loss model, the path loss model of the RFID signal is analyzed so as to determine the strength of the received signal of the RF tag receiving the signal transmitted by one RFID reader.

In the step of defining the radio propagation spatial significance function, if the RF tag in an arbitrary location can be recognized by the plurality of RFID readers, the strength of the received signal is determined.

Then, through extending the above, the strength of the received signal is determined in every discrete location of the building interior space and then the radio propagation spatial significance function is defined for determining if the RFID reader is installed in an appropriate location based on the determined strength of the received signal.

First, if the plurality of RFID readers is arranged, the strength of the received signal of the RF tag in the arbitrary location is determined S426 by Equation 11.

$$P_r^j = \text{Max}_{i \in RR}\{\text{normalized } P_r^{(i,j)}\} \quad (11)$$

In equation 11, $R_r$ refers to a set of every RFID reader. $P_r^j$ refers to the strength of the received signal in the location j.

If the RF tag in the RFID-based location recognition system can communicate with at least one RFID reader, cell-based location recognition can be achieved. Therefore, like equation 11, the strength of the received signal in each location is determined as the greatest value among the normalized $P_r^{(i,j)}$ value received from all RFID readers.

Next, if the plurality of RFID readers is arranged, the radio propagation spatial significance function determining if the RFID reader is installed in the appropriate location is defined as Equation 12.

$$\frac{1}{|PA|} \sum_{i \in PA} P_r^i x_i \quad (12)$$

In equation 12, PA refers to a set of all particles, as defined previously.

Equation 12 is an average value of the strength of the received signal of every discrete location in the building interior space according to the arrangement of the RFID reader, i.e. the value of the radio propagation spatial significance S428.

Especially, the values of equations 11 and 12 are dependent on the location of the RFID reader so that it is characterized in that the values are variable during the optimizing step (S110 of FIG. 1) attempting the various arrangement of the RFID reader.

Therefore, in equation 12, it is determined if the RFID reader is arranged using a control variable or decision variable $x_i$. If the control variable or decision variable $x_i$ is 1, it represents that the RFID reader is arranged in the location i, and if the control variable or decision variable $x_i$ is 0, it represents that the RFID reader is not arranged in the location i.

In the meantime, the value of the building spatial significance S104 and S419 is independent of the characteristic of the RFID, so that it is characterized in that the value is a constant value invariable during the step of optimizing.

The step of analyzing the correlation between the building space and the radio propagation space is as follows.

The object of the step of analyzing the correlation between the building space S107 and the radio propagation space is to minimize the difference between the location recognition unit space and the space in which the signal transmitted by the RFID reader is propagated.

As defined above (S102 of FIG. 1), the location recognition unit space is a set of particles having the same CID field value generated by a result of the step of dividing the location recognition unit space.

The space in which the signal transmitted by an arbitrary RFID reader is propagated, i.e. the RF cell, is defined as a set of particles having the strength of the received signal transmitted by the RFID reader being greater than $RX_{Thresh}$. Therefore, the RF cell is expressed by following Equation 13.

$$RF\text{-}Cell(i) = \{j \in PA | P_r^{(i,j)} \geq RX_{Thresh}\} \quad (13)$$

In equation 13, RF-Cell(i) refers to an RF cell generated when the RFID reader is arranged in the location i. Then, the location recognition unit space is expressed by following Equation 14.

$$LU\text{-}Cell(i) = \{j \in PA | CID(i) = CID(j)\} \quad (14)$$

In equation 14, CID(i) refers to the CID field value of the particle arranged in the location i.

Figure 7:
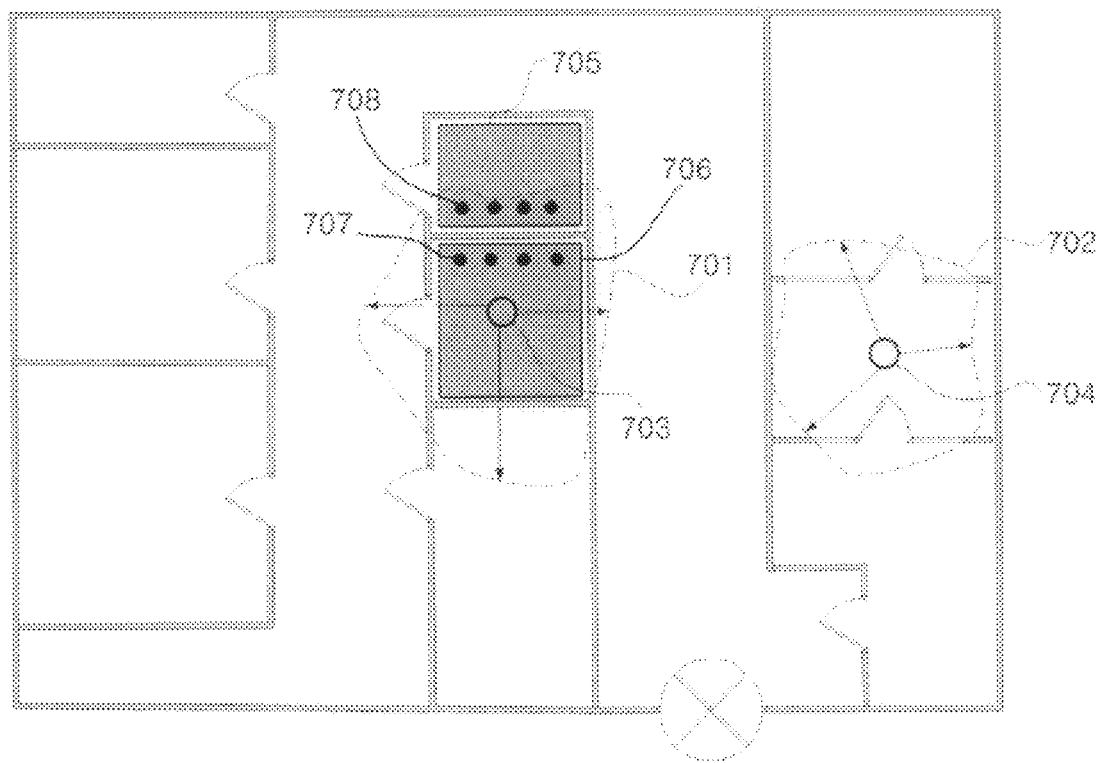
FIG. 7 is a diagram illustrating a relation between an RF cell and a location recognition unit space in the step of analyzing the correlation between the building space and the radio propagation space according to the present invention.

As shown in FIG. 7, the RF cells 701 and 702 are dependent on the attenuation by the locations of the RFID readers 703 and 704, the obstacle, and the signal transmission distance so that the RF cells 701 and 702 have irregular shapes.

On the other hand, the location recognition unit spaces 705 and 706 are dependent on the building space. Therefore, there exists the particle 707 having the same the RF cell as the location recognition unit space, but exists the particle 708 the different RF cell from the location recognition unit space.

It is impossible to determine if the tag recognized by the RFID reader 703 exists in the location recognition unit space 705 or the location recognition unit space 706. Therefore, in "the step of analyzing the correlation between the building space and the radio propagation space", the "correlation coefficient between the building space and the radio propagation space" is defined in order to minimize the difference between the RFID cell and the location recognition unit space.

If the plurality of RFID readers is arranged, the correlation coefficient between the building space and the radio propagation space (S108 of FIG. 1) according to the arrangement of the RFID readers is expressed by following Equation 15.

$$\frac{1}{\sum x_i} \sum_{i \in PA} \left( \sum_{j \in LU-Cell} \left[ \frac{|RF - Cell(i) \cap j|}{|RF - Cell(i)|} \right]^2 \right) \quad (15)$$

In equation 15, as described above, xi refers to the control variable determining if the RFID reader is arranged in the location i or not. Further, the Lu-Cell is a set of all location recognition unit spaces.

Therefore, |RF-Cell (i)∩ j| of equation 15 represents the number of particles sharing the RF cell and the location recognition unit space j with respect to an arbitrary RFID reader installed in the location i, and is divided by |RF-Cell(i)|, to be represented as the normalized value.

Further, j is an element of the set of all location recognition unit spaces so that the aforementioned step is repeatedly performed with respect to every location recognition unit space, respectively.

Therefore, $$\sum_{j \in LU-Cell} \left[ \frac{|RF - Cell(i) \cap j|}{|RF - Cell(i)|} \right]^2$$

refers to a value representing how similarly the RF cell generated when the RFID reader is arranged in location i and all location recognition unit spaces are constructed, and as the value becomes greater, the RF cell and the location recognition unit space becomes more similar with each other.

That is repeatedly performed for every installed RFID reader, and is then divided by the number of RFID readers to be expressed as the normalized value.

In the meantime, the correlation coefficient between the building space and the radio propagation space is also dependent on the location of the RFID reader, like the building spatial significance, so that it is characterized in that the correlation coefficient between the building space and the radio propagation space is variable in the step (S110 of FIG. 1) of optimizing for variously arranging the RFID readers.

The objective function in the method of optimization of the RFID location recognition system according to the present invention is defined as follows.

The object of the present invention is to extract information from the blueprint and determines the location for installing the RFID reader for improving the location recognition of the RFID-based building interior location recognition system.

In order to achieve the above object, the building spatial significance stored in the SIGST field of the particle information table, the radio propagation spatial significance defined by equation 11, and the correlation coefficient between the building space and the radio propagation space defined by equation 15 are derived.

The objective function of the present invention using the above features is expressed by following Equation 16.

$$F = \frac{\frac{1}{\sum x_i} \sum_{i \in PA} SIG_{ST}(i) x_i \times \frac{1}{|PA|} \sum_{i \in PA} P_r^i x_i \times}{\frac{1}{\sum x_i} \sum_{i \in PA} x_i \left( \sum_{j \in LU-Cell} \left[ \frac{RF - Cell(i) \cap j}{RF - Cell(i)} \right]^2 \right)} \quad (16)$$

In equation 16, $SIG_{ST}(i)$ refers to the SIGST field value of the particle in the location i. Therefore, the first term refers to an average value of the building spatial significance of the location of the RFID reader.

Then, the second term is the value of the radio propagation spatial significance when the RFID reader is arranged.

Last, the third term is the value of the correlation coefficient between the building space and the radio propagation space when the RFID reader is arranged.

Further, in equation 17, the number of installable RFID readers is a maximum of N.

Therefore, the objective function and the limitation condition determine the optimum location of the RFID reader in the state where the number of RFID readers is limited.

The limitation condition according to the objective function of equation 16 is expressed by following Equation 17.

$$\sum_{i \in PA} x_i \leq IN \quad (17)$$

The steps of optimizing and outputting the optimized location of the RFID reader are as follows.

The method for optimizing S110 the objective function suggested in the present invention employs genetic algorithm, and the genetic algorithm is a well-known technology and is not included in the present invention, so that the description there of is omitted.

If the suggested objective function is optimized, the value of the control variable xi is determined. The final step of the present invention of outputting the location of the RFID reader is as follows.

The RFID reader is installed in the location where the value of the control variable $x_i$ is 1, and is not installed in the location where the value of the control variable $x_i$ is 0.

As such, according to the method for optimization in the RFID location recognition system using the blueprint of the present invention, the dependence between the space for installing the RFID reader and the arrangement of the RFID reader using the blueprint is analyzed, and the optimum location of the RFID reader is automatically determined based on the analyzed dependence for improving the location recognition.

The method for optimization in the RFID location recognition system using the blueprint according to the present invention has the following advantages.

The present invention determines the optimum location of the RFID reader by limiting the number of RFID readers and using the blueprint at the same time in order to improve the location recognition of the RFID-based location recognition system.

Therefore, the present invention has an advantage in that the RFID-based location recognition system, which is cost-effective and has great recognition, can be established.

Further, the present invention advantageously provides the method for optimization in the RFID location recognition system using the blueprint in which, if the objective function is determined, the optimum location of the RFID reader can be determined by software using the widely-used optimizing algorithm and the computer.

An administrator of the RFID-based location recognition system can identify the optimum location of the RFID reader determined through an outputting device of the computer and use the optimum location for installing the location recognition system right away.

Through the above description, it will be understood by those skilled in the art that various changes and modifications can be made thereto without departing from the technical spirit and scope of the present invention.

Further, the scope of the present invention is defined by the scope of the claims not by the detailed description, and it should be interpreted that every change or modification derived from the meanings and scopes of the claims and the equivalent concepts belongs to the scope of the present invention.

What is claimed is:

1. A method for optimization in an RFID location recognition system using a blueprint which determines a location for arranging an RFID reader, the method comprising the steps of:

inputting a blueprint and dividing a location recognition unit space from the blueprint;

establishing a building interior space analysis model and an interior radio propagation space analysis model and deriving a building spatial significance and a radio propagation spatial significance;

analyzing correlation between a building space and a radio propagation space and deriving a correlation coefficient; and defining an objective function for determining a location of a RFID reader based on the building spatial significance, the radio propagation spatial significance, and the correlation coefficient between the building space and the radio propagation space and performing optimization, wherein the step of establishing the building interior space analysis model comprises the steps of:

analyzing a relation between a building interior space and a building exterior space for deriving an interior space graph model in which the building space is divided into a building interior and a building exterior;

analyzing a relation between the stories of the building space for deriving the interior space graph model in which the building interior space is departmentalized into a space for each story;

specifying the building space for each story for deriving the interior space graph model in which the building interior space for each story is specified as the location recognition unit space; and analyzing a movement route for revaluating worth of a node in which every available movement route of a tag is considered.

2. The method as claimed in claim 1, wherein the step of analyzing the relation between the building interior space and the building exterior space comprises the steps of:

constructing a space node representing the building interior and a space node representing the building exterior;

constructing a gate of the building as an interface node;

setting the worth of the space node representing the building interior as 1, the worth of the space node representing the building exterior as 0, and the worth of every interface node as 1/the number of interface nodes;

constructing an edge between the space node and the interface node according to a definition that, if there is a movement route without passing one node between two arbitrary nodes, the movement route is connected by the edge; and initializing a node information table and an edge information table.

3. The method as claimed in claim 2, wherein the node information table comprises an NID field representing an ID of each node, a TYPE field discriminating if a corresponding node is the space node or the interface node, a UTIL field representing a worth value of the node; and an SPIDs field representing a set of ID of every particle included in the space represented by the node.

4. The method as claimed in claim 2, wherein the edge information table comprises an EID field representing an ID of the edge, an NID 1 field representing an ID value of the node connected to both ends of the edge, an NID 2 field, and a UTIL field representing the worth value of the edge.

5. The method as claimed in claim 1, wherein the step of analyzing relation between the stories of the building space comprises the steps of:

departmentalizing the building interior space into a space node representing each story;

representing the worth of the departmentalized space node as a ratio of the number of particles included in the corresponding story to the number of total particles;

constructing stairs, automatic stairs, and an elevator as an interface node;

calculating the worth of the interface node; and constructing an edge between the nodes according to a definition of the edge.

6. The method as claimed in claim 1, wherein the step of specifying the building space for each story comprises the steps of:

departmentalizing the building space for each story into a space node representing the location recognition unit space;

representing the worth of the departmentalized space node as a ratio of the number of particles included in the corresponding location recognition unit space to the number of total particles;

constructing a gate as an interface node;

calculating the worth of the interface node; and constructing an edge between the nodes according to a definition of the edge.

7. The method as claimed in claim 1, wherein the step of analyzing the movement route comprises the steps of:

constructing the shortest route with respect to every pair of nodes available in the interior space graph model established through the step of specifying the building space for each story;
giving the worth of the edge based on constructed shortest route information;
normalizing the worth of the edge; and
renewing the worth of the node.

8. The method as claimed in claim 7, wherein the step of normalizing the worth of the edge comprises the steps of:
repeatedly retrieving each edge e included in SPath(i,j) in the edge information table with respect to every pair (i,j) of nodes if the nodes i and j are included in a node set V of the interior space graph G and increasing a UTIL field value of an entry representing the edge e by 1, the UTIL field representing a worth value of the node; and
normalizing the UTIL field of each edge with reference of a summed value of the UTIL field value of every edge.

9. The method as claimed in claim 1, wherein the step of deriving the building spatial significance comprises the steps of:
normalizing a worth of each node based on a result of establishing the building interior space analysis model;
deriving a building spatial significance of each particle based on an SPIDs field of a space node stored in a node information table, the SPIDs field representing a set of ID of every particle; and
storing the derived building spatial significance in an SIGST field of a particle information table, the SIGST field representing the building spatial significance of the location of the arranged particle.

10. The method as claimed in claim 1, wherein the step of establishing the interior radio propagation space analysis model comprises the steps of:
analyzing an RFID signal loss model considering attenuation of an RFID signal; and
defining a radio propagation space significance function determining if an RFID reader is installed in an appropriate location when the RFID readers are arranged.

11. The method as claimed in claim 10, wherein the step of analyzing the RFID signal loss model comprises the steps of:
analyzing a path loss according to a distance between the RFID reader and an RF tag;
analyzing a path loss by a wall and a floor existing between the RFID reader and the RF tag;
determining a received signal strength based on the result of analyzing the path loss according to the distance between the RFID reader and the RF tag, the result of analyzing the path loss by the wall and the floor, a signal transmission strength of the RFID reader; an antenna power gain of the RFID reader, and a power gain of the RF tag; and
normalizing the received signal strength.

12. The method as claimed in claim 11, wherein, in the step of analyzing the path loss according to the distance between the RFID reader and the RF tag, the path loss is calculated by $$PL(d) = 40\log_{10}\left(\frac{4}{\lambda}\right) + 40\log_{10}(d),$$

in which d refers to a distance m between the RFID reader and the RF tag, PL(d) refers to the path loss (dB) depending on the distance d, and λ refers to a ratio of "speed of light/frequency of the radio wave", serving as a value representing a wavelength of the RF radio wave, and a first term of the right side represents the natural attenuation according to the wavelength of the radio wave and a second term represents the attenuation according to the transmission distance of the signal.

13. The method as claimed in claim 11, wherein, in the step of analyzing the path loss by the wall and the floor existing between the RFID reader and the RF tag, the path loss is calculated by $PL(i,j)=2*WAF*W_{i,j}+2*FAF*F_{i,j}$,
in which PL(i,j) refers to a function representing the path loss generated by an obstacle located between the location i of the RFID reader and the location j of the RF tag, the locations i and j are one of the discrete spaces, i.e. the locations of the particles arranged in the lattice unit, a Wall Attenuation Factor (WAF) refers to the path loss factor by the wall, a Floor Attenuation Factor (FAF) refers to the path loss factor by the floor, $W_{i,j}$ refers to the number of walls located between the location i and the location j, and $F_{i,j}$ refers to the number of stories located between the location i and the location j.

14. The method as claimed in claim 11, wherein, in the step of determining the received signal strength, the strength is calculated by $P_r^{(i,j)}=P_t+G_{rr}+G_{rt}2G_{tag}-PL(d_{i,j})-PL(i,j)$,
in which $P_t$ refers to the strength (dB) of the signal transmitted by the RFID reader, $G_{rr}$ refers to the power gain (dB) of a receipt antenna of the RFID reader, $G_{rt}$ refers to the power gain (dB) of a transmission antenna of the RFID reader, $G_t$ refers to the power gain (dB) of a tag antenna, and $d_{i,j}$ refers to a distance between the $i^{th}$ RFID reader and the $j^{th}$ RF tag.

15. The method as claimed in claim 10, wherein the step of defining the radio propagation space significance function comprises the steps of:
determining a received signal strength of an arbitrary location when an RF tag in the arbitrary location can be recognized by a plurality of RFID readers; and
determining the received signal strength in every discrete location of the building interior space.

16. The method as claimed in claim 1, wherein, in the step of defining the objective function for determining the location of the RFID reader, the function is expressed by $$F = \cfrac{\frac{1}{\sum x_i}\sum_{i\in PA} SIG_{ST}(i)x_i \times \frac{1}{|PA|}\sum_{i\in PA} P_r^j x_i \times}{\frac{1}{\sum x_i}\sum_{i\in PA} x_i\left(\sum_{j\in LU-Cell}\left[\frac{RF-\text{Cell}(i) \cap j}{RF-\text{Cell}(i)}\right]^2\right)},$$

in which SIGST(i refers to an SIGST field value of a particle in a location I, a first term refers to an average value of the building spatial significance of the location of the RFID reader, a second term is a value of the radio propagation spatial significance when the RFID reader is arranged, and a third term is a value of the correlation coefficient between the building space and the radio propagation space when the RFID reader is arranged, and a limitation condition according to the objective function is expressed by $$\sum_{i\in PA} x_i \leq IN.$$

17. A method for optimization in an RFID location recognition system using a blueprint which determines a location for arranging an RFID reader, the method comprising the steps of:
inputting a blueprint and dividing a location recognition unit space from the blueprint;

establishing a building interior space analysis model and an interior radio propagation space analysis model and deriving a building spatial significance and a radio propagation spatial significance;

analyzing correlation between a building space and a radio propagation space and deriving a correlation coefficient; and defining an objective function for determining a location of a RFID reader based on the building spatial significance, the radio propagation spatial significance, and the correlation coefficient between the building space and the radio propagation space and performing optimization, wherein the step of dividing the location recognition unit space comprises the steps of:

arranging a consecutive interior space on a particle arranged in a lattice unit and converting the arranged space into a discrete space;

initializing a particle information table and determining whether a location of the particle is an inside of a wall or not, in which if the location of the particle is the inside of the wall, a Wall field value is renewed as 1, and if the location of the particle is not the inside of the wall, a Wall field value is renewed as 0;

constructing a visibility graph from the particle arranged in the lattice unit;

dividing the visibility graph into complete sub-graphs; and deriving the location recognition unit space from the complete sub-graphs and setting a Cell Identification Code (CID) field of the particle information table as a Particle Identification Code (PID) field having the smallest value in the particles included in the location recognition unit space.

18. The method as claimed in claim 17, wherein the particle information table comprises the PID field representing a unique value of an ID of each particle, a CoordX field representing an abscissa of a particle, a CoordY field representing an ordinate of a particle, a CoordH field representing a height coordinate of a particle, the Wall field representing whether the location of the particle is the inside of the wall or not, and SIGST field representing the building spatial significance of the location of the arranged particle, and the CID field having the smallest PID value among every particle included in the same location recognition unit space of the corresponding particle.

* * * * *